United States Patent [19]

Andersson

[11] Patent Number: 4,483,889
[45] Date of Patent: Nov. 20, 1984

[54] METHOD FOR THE PRODUCTION OF FIBRE COMPOSITE MATERIALS IMPREGNATED WITH RESIN

[75] Inventor: Bengt Andersson, Söråker, Sweden

[73] Assignee: KemaNord AB, Stockholm, Sweden

[21] Appl. No.: 519,237

[22] Filed: Aug. 2, 1983

[30] Foreign Application Priority Data

Aug. 5, 1982 [SE] Sweden ................................. 8204595

[51] Int. Cl.³ .............................................. B05D 3/02
[52] U.S. Cl. ............................... 427/389.9; 162/168.2; 162/168.7; 162/169; 427/391
[58] Field of Search ................... 162/168.2, 168.7, 169; 427/391, 55, 389.9; 428/530, 531

[56] References Cited

U.S. PATENT DOCUMENTS

| | | | |
|---|---|---|---|
| 4,133,688 | 1/1979 | Sack | 162/168.2 |
| 4,355,081 | 10/1982 | Kinsley | 428/530 X |
| 4,379,194 | 4/1983 | Clarke et al. | 428/530 X |

FOREIGN PATENT DOCUMENTS

| | | |
|---|---|---|
| 41054 | 12/1981 | European Pat. Off. |
| 1398308 | 6/1975 | United Kingdom |

OTHER PUBLICATIONS

TAPPI, Dec. 1973, vol. 56, No. 12–Microsphere Paper, pp. 157–160.

*Primary Examiner*—Michael R. Lusignan
*Attorney, Agent, or Firm*—Fred Philpitt

[57] ABSTRACT

A method for the production of a composite material in the form of a web, the material comprising fibres, a curable resin and expanded microspheres. A web of fibres and microspheres is formed, and the curable resin is added subsequently.

7 Claims, No Drawings

METHOD FOR THE PRODUCTION OF FIBRE COMPOSITE MATERIALS IMPREGNATED WITH RESIN

TECHNICAL FIELD

The present invention relates to a method for the production of composite materials in the form of webs, which materials comprise fibres, a curable resin and expanded thermoplastic microspheres.

BACKGROUND OF THE INVENTION

The Swedish patent application No. 8003776-5 discloses a foam composite material, which includes a web of woven or non-woven material. The web is impregnated with a curable resin and contains expanded microspheres. The curable resin in the material is only partly cured and there is thus a remaining capability of bonding. Although this foam composite material can be used as such, it is particularly suitable for use in the production of different kinds of laminates, both by lamination of several such foam composite materials with other materials. The expanded microspheres confer a low density to the laminates, while the fibre web gives a high strength and local weaknesses are avoided by a homogeneous distribution of the microspheres in the fibre material. The fibre web is also a carrier for the microspheres and facilitates a uniform pick-up and distribution of these and is also of importance in obtaining a uniform heat transfer at the expansion of the microspheres. In addition to a low density, the microspheres also give the foam composite material flexibility and compressibility. These properties allow an adaption of the material to irregularities in other materials in connection with the lamination, and this generally improves the adhesion and also acts to smooth out the surface. The compressibility also means, that it is possible to vary the final density of the laminate by means of the press operation. The only partially cured resin in the foam composite material means, that many different materials can easily be bonded to the foam composite material and the resin is still sufficiently soft at the lamination operation, so that all the above-mentioned flexibility properties can be made use of. The final product, with the cured resin, has good dimensional stability, a high stiffness relative to the weight and is not brittle.

The foam composite material has been prepared by impregnating a fibre web with a liquid containing the curable resin and unexpanded microspheres and the web is then heated to expand the microspheres, to partly cure the resin and to dry the web. It has, however, been found, that this method of production causes problems in some cases. The application of heat at the expansion can sometimes cause an uncontrolled curing of the resin, which is present at the same time. Dense and compact fibre webs cannot be impregnated even with unexpanded microspheres, so that a homogeneous distribution is obtained. If, in order to avoid these problems, the liquid instead is added at the formation of the web, the compacting of this is made more difficult, and there will be problems with operation shut-downs due to the presence of the resin in the equipment for formation of the dense fibre web. Corresponding apparatus problem may arise at any desired post-treatment of the impregnated web. Since the resin will first wet unexpanded microspheres and then be deposited on the fibres, there will often be a too small amount of resin on the microspheres after the subsequent expansion, due to the considerable increase of the surface of the spheres at the expansion, which gives poor adhesion. The problems are particularly pronounced, when the fibres are more hydrophilic than the microspheres, e.g. when cellulose fibres are used.

THE INVENTION IN GENERAL

It is an object of the present invention to offer a new production method for the foam composite material stated above, which method avoids the above-mentioned problems. This is achieved by the measures evident from the claims.

According to the invention a web of fibres and microspheres is first formed and the curable resin is then added. This gives a more suitable distribution of the resin between the microspheres and the fibres. It also makes it possible to produce a completely dry web of fibres and microspheres, which later can be impregnated with varying amounts of resin and with different kinds of resin, which is useful. Furthermore, a dry web is more suitable for impregnation and the drying is facilitated, if there is no resin present. If desired, the web can be treated in different manners, for example be glazed or compressed, without consideration of the presence of a resin, and it is also possible to expand the microspheres without having to consider the risk of curing the resin. Particularly, it is possible to deposit both microspheres and fibres from a suspension without risks for deposition of resin in the equipment used. A homogeneous distribution of the microspheres in the mass of fibres can be obtained in this manner, also at the formation of a dense web. It is particularly suitable to add unexpanded microspheres and to expand these at the drying of the web, since these steps can be carried out in existing paper machines without substantial modifications. The subsequent impregnation step can be designed and optimized almost only with consideration of what is required for the resin.

Further objects and advantages of the invention will be evident from the more detailed description below.

DETAILED DESCRIPTION OF THE INVENTION

The fibre material can be inorganic and for example comprise carbon fibres, mineral wool fibres and particularly glass fibres. Organic fibres are, however, preferably used for the method of the invention, for example synthetic polymer fibres such as polyester fibres. It is particularly suitable to use cellulose fibres, solely or in admixture with other types of fibres.

The curable resins which are used should be soluble in some solvent to get a sufficiently low viscosity. Water soluble resins are preferably used, and among these suitably so-called formaldehyde based resins with urea, phenol, resorcinol or melamine. Phenol resins, optionally modified with melamine, are preferably used.

The microspheres, which are used at the production of the fibre composite material of the invention, have shells, which can be made up of copolymers of vinyl chloride and vinylidene chloride, copolymers of vinyl chloride and acrylonitrile, copolymers of vinylidene chloride and acrylonitrile and copolymers of styrene and acrylonitrile. Further can be mentioned copolymers of methylmethacrylate containing up to about 20 percent by weight of styrene, copolymers of methyl methacrylate and up to about 50 percent by weight of combined monomers of ethyl methacrylate, copolymers of methylmethacrylate and up to about 70 percent by weight of ortochlorostyrene. The particle size of the unexpanded spheres, and thus also for the expanded spheres, may vary within wide limits and is selected with respect to the desired properties of the final product. As examples of particle sizes for the unexpanded spheres can be mentioned 1 µm to 1 mm, preferably 2 µm to 0.5 mm and especially 5 µm to 50 µm. The diameter of the microspheres increases by a factor 2–5 at the expansion. The unexpanded spheres contain volatile, liquid blowing agents, which are vaporized when heat is supplied. The blowing agents may for example be freones, hydrocarbons such as n-petane, i-petane, neopentane, butane, i-butane or other blowing agents, which are conventional for microspheres of the type described here. Suitably, the blowing agent is 5 to 30 percent by weight of the microsphere. The microspheres can be added in different manners, as dried particles or in a suspension, e.g. in an alcohol such as methanol.

It is possible to use a formed fibre web and add the microspheres by impregnating with a slurry of the microspheres in a liquid. This method can for example be used, if the fibre web has a fairly good porosity or when it is desired to minimize the drying step in the process. However, for reasons discussed above, it is particularly advantageous to add the microspheres at the same time as the fibres are deposited to form a web, i.e. when the fibres are still separated from each other. The fibres and/or the microspheres can hereby be deposited from a gas phase, but it is preferred, that the fibres and the microspheres are kept slurried in a liquid, preferably in water, which optionally may contain a minor amount of solvent. It is advantageous to use conventional technique for the production of paper, i.e. to deposit the suspension on a wire with following dewatering. The fibre web should be thin, so that a uniform supply of heat will be obtained at an optional later expansion. The amount of fibre is suitably between 20 and 500 g/m$^2$ and preferably between 40 and 300 g/m$^2$. When the microspheres are added in a suspension, they should be unexpanded, if it is not desired to have a layering due to the buoyancy. The microspheres can be added by another suspension than the one used for the fibres. Separate liquids make it possible to deposit layered webs with varying ratios of microspheres to fibres in the different layers. A web, having a middle layer with microspheres and dense and smooth surface layers, can for example be produced in this manner. It is, however, suitable that the microsphere suspension contains a certain amount of fibres. However, a web, having a homogeneous distribution of the microspheres, is preferably produced according to the invention, which gives laminates with a high internal bond, and it is then suitable to use the same suspension for the fibres and the microspheres. Conventional additives such as wet strength agents, retention agents, fillers, etc., can of course be added at the formation of the web.

The web should be dewatered and preferably dried before the resin is added, since it is difficult to impregnate a wet web uniformly. It is further preferred, that the microspheres are already expanded, when the resin is added, as this facilitates the resin impregnation step considerably and gives a better adhesion of the microspheres to the fibres in the web. The microspheres can be expanded at any time after the formation of the web, e.g. in connection with a glazing or calandering step for the web, but it is preferred that the microspheres are expanded in connection with the drying, as this gives the best adhesion of the microspheres to the finished web. These operations can advantageously be carried out in the drying section of a conventional paper machine by means of heated rolls, IR-radiation or microwave energy. When very high microsphere loadings and low densities are desired, e.g. microsphere volume fractions between 70 and 95 percent, or when thick materials are to be produced, e.g. materials above 2 or 3 mm in thickness with expanded microspheres, it can be preferred to dry the web without expanding the spheres because of the relatively low resin uptake on unexpanded spheres and the possibility of faster and more thorough expansion in a separate step. This is most easily achieved at impregnation with water-based adhesives on cellulosic fibres, due to the loosened adhesion between the wetted fibres. The temperature at the expansion shall be sufficiently high, so that the blowing agent in the microspheres is vaporized, but not so high that the thermoplastic material of the spheres melts. Normal temperature are between 80° and 150° C. and particularly between 100° and 120° C. As has been mentioned, the web must not be so thick at the expansion, that the transfer of heat to its middle is made difficult, when microspheres close to the surfaces have started to expand. A suitable thickness of the web before the expansion is 0.01 to 1.5 mm and particularly 0.1 to 1 mm. Further it is suitable, that the web has a density before the expansion of between 500 and 1500, particularly between 700 and 1200 kg/m$^3$, based on dry material. If desired, the web can be post-treated in any manner before the resin impregnation.

The resin, which is applied separate from the microspheres, should be in a low viscosity form, so that it will penetrate the web satisfactorily, and have a fairly low resin content, so that the amount of resin picked up will not be too great. For formaldehyde based resins, according to the above, water solutions are used, optionally with added solvent such as alcohols to get a more rapid drying, and they suitably have a dry content below 30 percent by weight. A dry content between 5 and 25 percent by weight is particularly suitable. Conventional additives can be used in the impregnation solution, e.g. curing catalysts, pigments, etc.. A low dry content at the impregnation after the expansion of the microspheres leads to a uniform distribution of the resin between microspheres and fibres and counteracts the risk of insufficient wetting of the expanded microspheres in competition with the fibres. The impregnation can be carried out by dipping the web in the solution but is preferably carried out by spraying. The amount of liquid picked up can optionally be adjusted by means of wipers of press rolls. Conventional impregnation equipment can be used, but if pressure between rolls etc. is applied, it must be kept low, not to destroy the microspheres.

It is possible to use the product in wet condition immediately after the resin impregnation by assembling several such layers and/or other materials, and then dry and cure the resin, so that a laminate is formed. It is, however, preferred, that the web is dried before it is used for the production of laminates, since this simplifies the subsequent lamination step, shortens the final curing time and consolidates the material. In the dried material the resin can be completely cured to the C-stage and the product can be used as such, for example as a light weight substitute material for balsa wood for interior decoration or hobby work. It is, however, preferred, that the resin is only partially cured and in the B-stage. In this connection it should be mentioned, that a curable resin, which is in the A-stage, is meltable, little cross-linked and soluble in acetone and other solvents. A resin in the C-stage is not meltable, completely cross-linked and insoluble. The B-stage is a stage between the A- and C-stage. With the resin in the B-stage sufficient bonding capacity remains to allow the material to form homogeneous or heterogenous laminates by a final curing of the resin into the C-stage at pressing and heating. With the resin in the B-stage the material is still soft and adaptive with simultaneous good consolidation of the components of the material. The final curing takes place rapidly, and the material is not sticky at room temperature. Drying and partial curing are suitably carried out at the same time by heating to a temperature between 80° and 170° C. and particularly between 95° and 150° C., e.g. by circulating hot air or by equipment similar to those mentioned for the drying of the web before the resin addition. Drying equipment conventionally used in impregnation processes can be used, but the temperature must be controlled, so that it never exceeds the melting point of the microspheres. After this treatment the web suitably has a thickness between 0.1 and 5 mm, particularly between 0.5 and 3 mm.

The weight ratio microspheres/microspheres plus resin in the finished foam composite material can vary between 2 and 80 percent, particularly between 5 and 60 percent and preferably between 15 and 30 percent. The amount of fibre can be between 10 and 150 percent of the total amount of microspheres and resin, particularly between 15 and 90 percent and preferably between 30 and 70 percent. The amount of resin should be between 10 and 90 percent by weight of the amount of fibres and microspheres, particularly between 20 and 80 and preferably between 30 and 70 percent. The volume part of microspheres in the material can be between 60 and 95 percent of the entire volume of the material when there are no essential other cavities in the material, otherwise it should be between 50 and 95 percent. The volume part is, however, preferably between 70 and 90 percent. The surface weight of the material can be between 40 and 1000 g/m$^2$. In addition to the above described, required components, the material can of course also contain different additives such as stabilizers, coupling agents, fillers, fire retarding agents and/or pigments.

The foam composite materials of the invention can be used in combination with all sorts of substrates for the preparation of laminates, these laminates are called heterogeneous laminates below. It is also possible to laminate several layers of the foam composite material of the invention for the production of multi-layered laminates of the foam composite material according to the invention, and these laminates will be called homogeneous laminates below. It is of course also possible to produce mixed laminates containing at least one homogeneous laminate and at least one other material.

At the production of heterogeneous laminates the foam composite material of the invention is combined with any carrier substrate and the combination of foam composite material and support is pressed at an increased temperature. Press time, temperature and pressure are selected primarily with consideration to the type of resin and microspheres used. The press time can generally vary between 20 seconds and 20 minutes. The temperature can for example be between 100° and 180° C. and the pressure for example between 0.001 and 3 MPa high pressures at compression of the microspheres.

If the carrier substrate has a rough and uneven surface, particularly attractive effects can thereby be attained, when the foam composite material penetrates the cavities and fills them, while the "free" surface of the foam composite material, i.e. the surface turned to the press plate, will be completely smooth, since the microspheres close to the press plate collapse by the pressure, while unexpanded microspheres close to the rough surface penetrate into the cavities and fill them. A levelling of the surface is thus achieved. In practice this effect can be obtained e.g. in connection with the production of plywood. In conventional production of plywood sized veneers are first prepared and these are then pressed to form plywood. In order to get a satisfying surface, the rough surface is then ground and a surface coating is then pressed onto the plywood surface. Using the foam composite material according to the present invention, it is possible to press together several veneer sheets and a thin sheet of a foam composite material in one single step, and, after pressing, plywood with a hard and completely smooth surface layer consisting of a foam composite material according to the invention is obtained. In the material the resin is completely cured and the microspheres have collapsed partly. Other properties, which can be obtained in heterogeneous laminates, containing a foam composite material according to the invention, are improved flame retarding properties. It is possible to get a laminate surface suitable for painting and (wall) paper covering, to get a higher flexural modulus and a surface, that is water repellant and thermal insulating. In sheet material a decrease of the skew of the plate, may be achieved.

Lamination with wood gives a material with the surface properties of wood but with a reduced density, which is usable for example in packings, coachworks or interior fittings. Lamination with metals, especially aluminum sheets or aluminium foils, gives a material with good and lasting surface properties and high stiffness but with reduced density, which can be used for example in packings, coachworks, building frontages, signboards or travel requisites. Lamination with papers, impregnated with formaldehyde-based resins, gives materials with resistant and/or decorative surfaces, high stiffness and low density suited for example for interior fittings, panels and signboards. In order to improve the adhesion between the impregnated paper and the foam composite material and to reduce the effects of the brittleness of the material, it is in these cases advantageous to arrange a middle sheet of for example cardboard. Lamination of materials with thermoplastic surfaces can give light decorative products suitable for panels in interior decoration. A coating of nylon flocks on the foam composite material gives a decorative and durable surface allowing pin attachments, which product can be used for example for noticeboards, interior fittings and signboards. Laminates with textiles have similar properties and uses. Numerous other heterogeneous laminates are of course possible. It is also possible to adhere the foam composite material of the invention against non-solid materials at the formation of these, for example to foam polyurethane against the foam composite material, preferably between two sheets of these, whereby not only a light and, relative to the weight, stiff product is obtained, but also there is achieved a more uniform foaming of the polyurethane material due to the low heat conduction and heat capacity of the foam composite material. The covering sheets also give a fire resistant effect relative to the polyurethane foam.

The mentioned properties are of special value, when the product is used as building elements. In heterogeneous laminates it is generally possible to introduce a middle sheet between the different materials in order to improve stiffness, adhesion and dent resistance. Paper or a fibre web can for example be used for this purpose and it is especially advantageous, that the sheet is impregnated with a curable resin.

The homogeneous laminates are prepared using pressure times, varying e.g. between 1 minute and 30 minutes. The pressure may for example vary between 0.01 and 0.5 MPa and the temperatures between 100° and 150° C. Suitably such conditions are chosen, that the expanded microspheres do not collapse. A light and strong material, which for example can be used as building material, is obtained, if the microspheres do not collapse. It should also be mentioned, that the layers can be laminated by gluing without application of heat.

The fibre composite material is heat mouldable in a non-cured condition and this allows for example formation of double-bent surfaces in connection with the lamination. Such a moulding can be carried out both at production of homogeneous and of heterogeneous laminates, when the other materials are pre-formed or can be formed under the lamination.

The invention is further illustrated in the following non-limiting example.

EXAMPLE

From a normal diluted aqueous pulp suspension containing cellulose fibres for board or kraft paper and unexpanded microspheres of vinylidene chloride/acrylonitrile containing blowing agent, a fibre web was deposited on the wire in a conventional paper machine. The web contained 200 g/m² fibre and 10 g/m² microspheres. After dewatering, the web was made to pass through the heated rolls in the drier section of the paper machine, where it was dried and heated to a final temperature of about 120° C., which caused the microspheres to expand. The web had a thickness of about 1.5 mm at this stage. A similar web prepared in the same manner but without microspheres was considerably thinner and had a density of about 900 kg/m³.

The dry paper web containing expanded microspheres was impregnated with 1800 g/m² of an aqueous solution containing 16 percent by weight of a phenol resin and was then dried in an IR-oven for about 20 minutes until it was dry and the resin was cured to the B-stage. The thickness of the web at this stage was 2 mm.

Four such web sections were assembled and pressed at a pressure of 0.15 MPa and a temperature of 135° C. for about 6 minutes and a completely cured product, having a thickness of 8 mm, was obtained.

The product had high bending and tensile strengths, despite a density of only 250 kg/m³. The volume part of microspheres in the product was 87 %.

I claim:

1. A method for the manufacture of a composite material in the form of a web and comprising fibres, a formaldehyde-based resin and expanded thermoplastic microspheres comprising the steps of
   (a) forming a liquid suspension of fibres and unexpanded thermoplastic microspheres containing a blowing agent,
   (b) depositing a web containing fibres and the unexpanded microspheres from said liquid suspension, the amount of fibres deposited being between 20 and 500 g/m² and the thickness of the web being between 0.01 and 1.5 mm,
   (c) heating the deposited web to a temperature sufficient to expand the thermoplastic microspheres but insufficient for melting the thermoplastic material of the microspheres,
   (d) drying the web containing the expanded thermoplastic microspheres,
   (e) impregnating the dried web with a precondensate of the formaldehyde-based resin to give a ratio of microspheres to the sum of microspheres and resin between 2 and 80 percent by weight, and
   (f) drying the web containing the precondensate of the formaldehyde based resin while maintaining the resin in a nonsticky B-stage,
   whereby the volume content of microspheres in the dried web containing resin and expanded microspheres is between 70 and 90 percent.

2. A method according to claim 1 wherein the curable resin is a formaldehyde-based resin with phenol, or resorcinol, or urea or melamine.

3. A method according to claim 1 wherein the fibres comprise cellulose fibres.

4. A method for the manufacture of a composite material in the form of a web and comprising fibres, a formaldehyde-based resin and expanded thermoplastic microspheres comprising the steps of
   (a) forming a suspension in liquid of fibres and unexpanded thermoplastic microspheres containing a blowing agent,
   (b) depositing a web containing the fibres and unexpanded microspheres from the suspension,
   (c) drying the web containing fibres and the unexpanded thermoplastic microspheres at a temperature below the vaporizing temperature for the blowing agent of the thermoplastic microspheres,
   (d) impregnating the dried web containing unexpanded thermoplastic microspheres with a precondensate of a formaldehyde-based resin to give a ratio of microspheres to the sum of microspheres and resin between 2 and 80 percent by weight, and
   (e) heating the web impregnated with the precondensate of formaldehyde-based resin to a temperature sufficent to expand the thermoplastic microspheres while maintaining the resin in a non-sticky B-stage,
   whereby a dry web having a volume content of microspheres between 70 and 95 percent is obtained.

5. The method of claim 4 wherein the dried web containing resin and expanded thermoplastic microspheres has a thickness above 2 or 3 mm.

6. method according to claim 4 wherein the curable resin is a formaldehyde-based resin with phenol, or resorcinol or urea or melamine.

7. A method according to claim 4 wherein the added fibres comprise cellulose fibres.

* * * * *